(12) United States Patent
Bailly et al.

(10) Patent No.: US 6,402,329 B1
(45) Date of Patent: Jun. 11, 2002

(54) ASSEMBLY FOR MOUNTING AND CORRECTING THE POSITION OF AN ELEMENT, SUCH AS A MIRROR, OF A SPACE TELESCOPE

(75) Inventors: Bruno Bailly, Les Adrets de l'Esterel; Michel Vacance, Auribeau/Siagne, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/581,553
(22) PCT Filed: Jan. 22, 1999
(86) PCT No.: PCT/FR99/00129
 § 371 (c)(1),
 (2), (4) Date: Aug. 9, 2000
(87) PCT Pub. No.: WO99/38044
 PCT Pub. Date: Jul. 29, 1999

(30) Foreign Application Priority Data

Jan. 22, 1998 (FR) .............................. 98 00663

(51) Int. Cl.[7] .............................................. G02B 7/182
(52) U.S. Cl. ...................... 359/872; 359/849; 248/476; 248/603
(58) Field of Search ................................ 359/224, 846, 359/849, 871, 872, 881; 248/476, 636, 603

(56) References Cited

U.S. PATENT DOCUMENTS 3,945,015 A * 3/1976 Gueguen ................. 343/765
4,629,297 A   12/1986 Horine
4,655,563 A    4/1987 Plante et al.
4,726,671 A    2/1988 Ahmad et al.
5,473,852 A * 12/1995 Lindsey .................... 52/648.1
5,545,040 A *  8/1996 Lu ............................. 434/58

FOREIGN PATENT DOCUMENTS

| DE | 36 16 202 | 2/1988 |
| DE | 41 17 538 | 7/1992 |
| EP | 0 628 940 | 12/1994 |
| FR | 2.180.252 | 11/1973 |
| FR | 2 517 019 | 5/1983 |
| FR | 2 534 663 | 4/1984 |
| FR | 2 622 980 | 5/1989 |
| FR | 2 724 236 | 3/1996 |

* cited by examiner

*Primary Examiner*—Mark A. Robinson
(74) *Attorney, Agent, or Firm*—Oblon, Spivak, McClelland, Maier & Neustadt, P.C.

(57) ABSTRACT

A device such as a secondary mirror of a space telescope is mounted isostatically on a support structure through an integrated compact assembly including three mounting devices, which are preferably identical and uniformly distributed around an axis of symmetry of the device to be supported. Each device is in the form of a deformable triangle in which a first arm materialized by at least a variable length arm is connected to the support structure, and in which the opposite vertex materialized by a support part is connected to the device to be supported. Friction free hinges with zero play connect the arms of the triangle together. Thus the position of the device to be supported can be corrected along six degrees of freedom.

24 Claims, 4 Drawing Sheets

ASSEMBLY FOR MOUNTING AND CORRECTING THE POSITION OF AN ELEMENT, SUCH AS A MIRROR, OF A SPACE TELESCOPE

DESCRIPTION

1. Technical Field

The invention relates to a compact integrated assembly designed for isostatic mounting of a device on a support structure, and allowing corrections to the position of this device along six degrees of freedom.

The term "isostatic" means that no stress is generated in the device supported by the mounting assembly.

The mounting assembly according to the invention may be used in many technical fields whenever it is desirable to be able to correct the position and orientation of the supported device with high precision, occupying a restricted volume and without generating any deformation to this device.

One particularly advantageous application relates to optical devices used on spacecraft, and particularly space telescopes.

2. State of the Art

Telescopes include different optical elements such as mirrors and lenses.

The optical performances of telescopes are strongly related to the alignment precisions of the optical elements contained in them. The requested precisions then increase with increasing required performances.

In the case of a space telescope, the optical elements are aligned on the ground.

This alignment is disturbed over time, particularly due to the following phenomena:

- residual deformations caused by launching loads (microdeformations of parts, sliding in links);
- ageing of materials;
- thermoelastic (cyclic) and hygroelastic effects.

Therefore, during the life of the telescope in orbit, it is desirable to be able to compensate these disturbing phenomena by a precise correction of the position of one or several optical elements of the telescope according to at least five degrees of freedom (in general the rotation of an optical element around its optical axis has no effect on optical performances). This position correction may be controlled by an onboard computer, or by remote control from the ground with a variable frequency and amplitude.

Therefore each optical element concerned is linked to the support structure by a mounting assembly equipped with position correction means.

The mounting assembly must include filter devices if the position correction is to be made without deformation of the optical element.

Furthermore, the mounting assembly must not be on the optical path of the telescope, to avoid blocking the light flux. This would cause a loss of the radiometric performances of the telescope. Therefore, it is important that the mounting assembly occupies the smallest possible volume. In particular, if the optical element is a mirror, this means that the mounting assembly can be placed behind the mirror.

Several different documents have proposed mounting assemblies with position correction means for optical elements in space telescopes.

Thus, document U.S. Pat. No. 4,629,297 proposes a secondary mirror of a telescope supported so that it can be adjusted in five degrees of freedom. The telescope comprises an outside tube, inside which the secondary mirror is installed by radially oriented arms. In the described device, the motors used to make remote controlled corrections to the position and orientation of the secondary mirror are located outside the outside tube. Movements are transmitted between motors and the flexible support of this secondary mirror by rods placed in some of the arms, which are then tubular.

This layout has the disadvantage that it reduces the tube outside diameter for a given overall size. Placing the motors outside the tube means that the tube diameter has to be smaller than it would otherwise be. Instrument performances are thus reduced.

Mounting assemblies using flexible rods placed tangentially between the device to be supported and the support structure are described in a number of documents, particularly document FR-A-2 517 019, document FR-A-2 180 252 and document FR-A-2 724 236. However, none of these assemblies enables position and/or orientation adjustment.

In document U.S. Pat. No. 4,726,671, flexible joints placed at each end of the tangent rods enable relative displacements of a mirror with respect to its support without applying unacceptable stresses on the mirror. However, adjustment possibilities offered. by this type of mechanism are not sufficient to satisfy the needs generated by the disturbances that occur after the adjustment made on the ground.

In document EP-A-0 628 940, a system with multiple jacks is inserted between a floor and platform to simulate flight movements on this platform. The system is connected to the floor at three points and to the platform at three other points. Two jacks are hinged at each of these points. The opposite ends of these jacks are connected to the vertices of a deformable triangle materialized by three other jacks, in order to form a set of adjacent deformable triangles.

Furthermore, document DE-C-41 17 538 proposes installing a plate supporting a telescope and its optical bench on a satellite platform, using three stands, each of which is materialized by two telescopic rods in V-formation, the ends of which are mounted on a ball joint, at three points on the platform and at six points on the plate.

DESCRIPTION OF THE INVENTION

The main purpose of the invention is a compact integrated assembly for mounting a device on a support structure, while allowing automatic position and attitude correction about six degrees of freedom, over a distance of up to a few hundred micrometers in translation and a few hundred microradians in rotation, with a resolution of a few tenths of a micrometer.

According to the invention, this result is achieved using a mounting assembly to mount a device on a support structure, characterized by the fact that it comprises three mounting devices each in the form of a deformable triangle in which a first variable length arm is mounted at its opposite ends on a pair of corresponding anchor parts that can be fixed to the support structure and in which a first vertex opposite the first arm is materialized by a corresponding support part that can be fixed on the device to be mounted.

In a preferred embodiment of the invention, the three mounting devices are identical.

When the device to be supported has an axis of symmetry, the three mounting devices are preferably uniformly distributed about this axis and the planes containing the triangles formed by the mounting devices are approximately tangent to a circle centered on the above-mentioned axis of symmetry.

Furthermore, the other arms of the triangle formed by each mounting device may be materialized either by rigid arms or by variable length arms. For rigid arms, the three arms of the triangle are connected to each other by friction free hinges with zero play.

Advantageously, the friction free hinges with zero play comprise pairs of flexible strips supported at least beyond each end of the other two arms of the triangle formed by each mounting device and aligned with the arms. Each pair of flexible strips then comprises two flexible strips fixed end to end along a longitudinal axis of the arm that they extend, and located in two planes orthogonal to each other and passing through the said longitudinal axis.

The other two arms of the triangle formed by each mounting device are generally connected to the support part through one of the friction free hinges with zero friction.

Preferably, the other two vertices of the triangle formed by each mounting device are materialized by two connecting parts. The other two arms of the triangle are then connected to each connecting part by means of one of the friction free hinges with zero play.

According to a preferred embodiment of the invention, the first arm of the triangle formed by each mounting device is materialized by two variable length arms located side by side approximately parallel to each other. Two first opposite ends of each of these two arms are then connected to two anchor parts that can be mounted on the support structure. The two opposite ends of the two arms cooperate with the two anchor parts, through guide means.

Two first opposite ends of each of these two arms are then connected to two anchor parts that can be mounted on the support structure. The two opposite ends of the two arms cooperate with the two anchor parts, through guide means.

In this case, each connecting part may be fixed to one of the second opposite ends of the arms and guide means are inserted between connecting parts and anchor parts.

Preferably, one of the friction free hinges with zero play is then inserted between the first end of each of the arms and the anchor part to which this first end is connected.

In the preferred embodiment of the invention, the longitudinal axes of the two arms are located in a plane which may be either the plane containing the triangle formed by the mounting device including these arms, or a plane approximately perpendicular to this plane.

According to a first variant embodiment of the invention, the first arm of the triangle formed by each mounting device is materialized by two variable length arms located end to end along a common longitudinal axis. Two first opposite ends of each of these two arms then cooperate with the said pair of anchor parts through guide means and two second adjacent ends of each of two arms are connected to a third anchor part that can be fixed on the support structure.

In this case, each connecting part is preferably connected to one of the first opposite ends of the arms and guide means are inserted between the connecting parts and the pair of anchor parts.

In this first variant embodiment of the invention, one of the friction free hinges with zero play may be inserted either between the third anchor part and the second end of each of the arms, or between the first end of each of the arms and the connecting part to which the arm is connected.

According to a second embodiment of the invention, the first arm of the triangle formed by each mounting device is materialized by a single variable length arm, one first end of which is fixed on a first anchor part of the said pair and on a second end of which cooperates with a second anchor part of the said pair through guide means. The first and second anchor parts are then mounted on the support structure.

In this case, a first connecting part is preferably fixed to the first anchor part. The second connecting part is then fixed to the second end of the single arm, and guide means are inserted between the second connecting part and the second anchor part.

In general, guide means may be either translation friction free guide means, or rotation guide means rotating about an axis perpendicular to a plane containing the triangle formed by each mounting device. In the former case, the guide means advantageously comprise at least one flexible strip perpendicular to the longitudinal axis of the arm with which these guide means cooperate. The flexible strip then connects this arm to the adjacent anchor part.

In a preferred application of the invention, the device to be supported is a space telescope mirror.

BRIEF DESCRIPTION OF THE DRAWINGS

We will now describe different embodiments of the invention as non-restrictive examples, with reference to the attached drawings in which.

DESCRIPTION OF THE PREFERRED EMBODIMENTS

Figure 1:
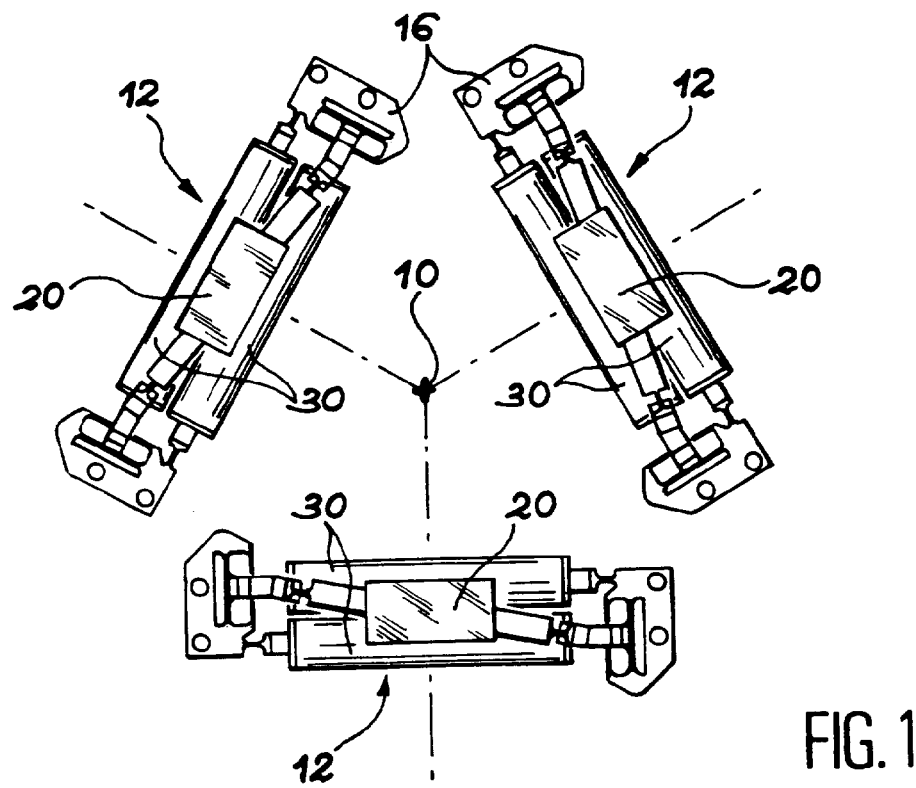
FIG. 1 shows a mounting assembly according to the invention observed along the axis of symmetry of the supported device, looking from this device towards the support structure.
Figure 2:
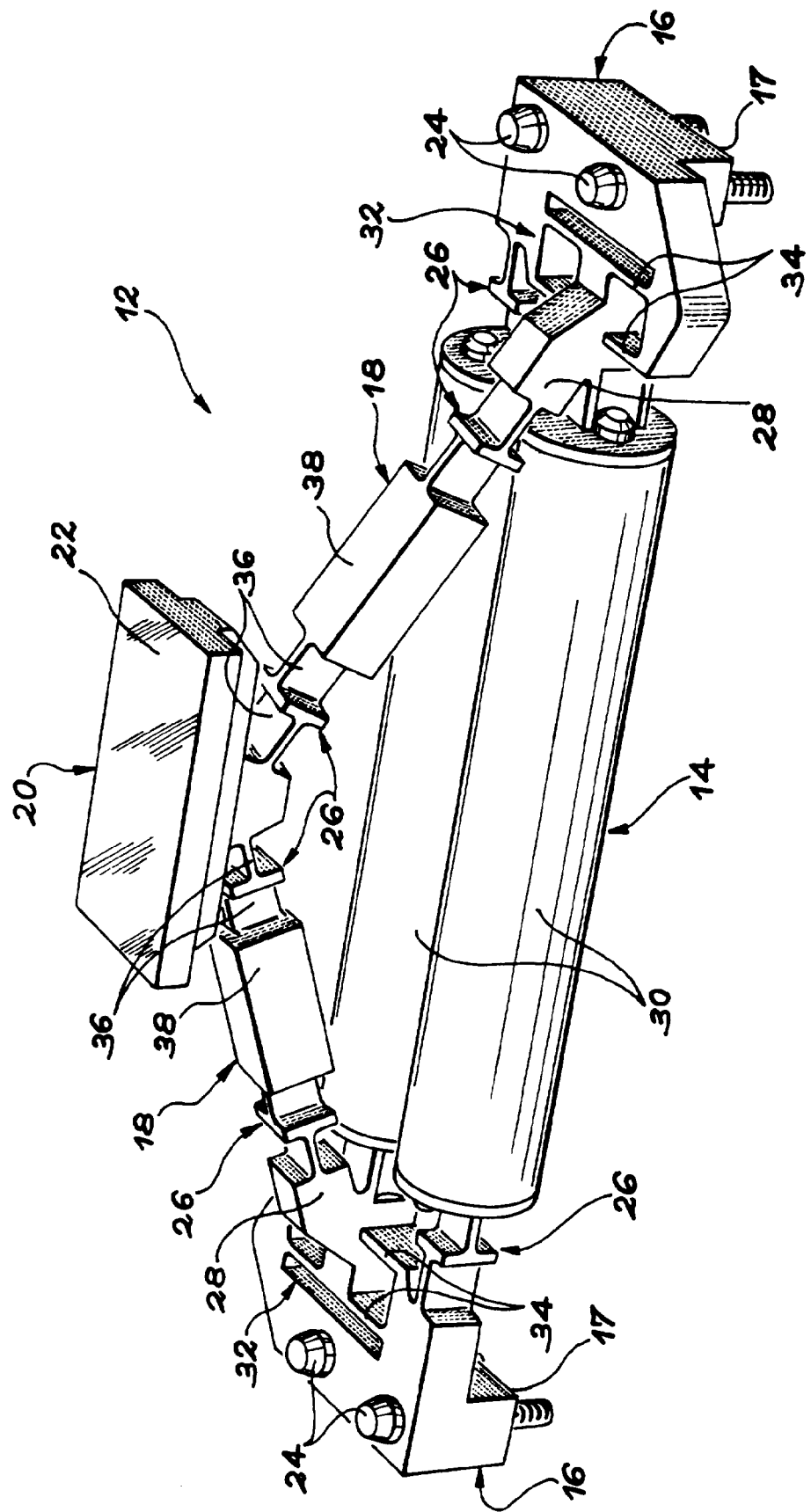
FIG. 2 is a perspective view that shows one of the mounting devices of the assembly in FIG. 1 and illustrates a preferred embodiment of the invention.

The preferred embodiment of the invention illustrated in FIGS. 1 and 2 relates to the case of a mounting assembly laid out symmetrically about the axis of symmetry 10 of a device (not shown) supported by this assembly. In other embodiments (not shown), this symmetry does not exist, either because the device to be supported does not have an axis of symmetry, or because this symmetry cannot be respected for practical reasons such as size problems.

As already mentioned, the mounting assembly according to the invention is particularly suitable for the case in which the device to be supported is a mirror such as the secondary mirror of a space telescope. However other applications may also be considered without going outside the framework of the invention.

As shown in FIG. 1, the mounting assembly according to the invention comprises three mounting devices 12 that are preferably identical. In the symmetrical layout illustrated in FIG. 1, the three mounting devices 12 are uniformly distributed by 120° angles from each other around the axis of symmetry 10 of the device to be supported.

As can be more clearly seen in FIG. 2, each mounting device 12 is approximately in the shape of a deformable triangle, in a plane parallel to the axis of symmetry 10 of the device to be supported. More precisely, the plane of the triangle formed by each of the mounting devices 12 is approximately tangent to a circle centered on the axis of symmetry 10 (FIG. 1).

More precisely, the deformable triangle formed by each of the mounting devices 12 comprises a first variable length arm 14 designed to be mounted on a support structure (not shown) by two anchor parts 16. The deformable triangle also comprises two second sides 18, usually of equal lengths, connected together at a first vertex of the triangle opposite the first arm 14 and materialized by a support part 20.

The support part 20 is in the form of a skid, on which one surface 22 is designed to be fixed on the device to be supported, for example by gluing. Consequently, the shape of the surface 22 is complementary to the shape of the device to be supported. The surface 22 is approximately perpendicular to the plane of the triangle formed by the mounting device 12, and faces the outside of this triangle. The surface 22 may also be parallel to the plane of the triangle if peripheral forces from the device to be supported are to be resisted.

Moreover, the anchor parts 16 form the other two vertices of the triangle formed by the mounting device 12. They are designed to be fixed to the support structure (not shown) by coplanar faces 17 approximately parallel to the surface 22 of the support part 20 and to the longitudinal axis of the first arm 14. In this case the anchor parts 16 are attached to the support structure by screws 24. The surfaces 17 face the outside of the triangle formed by the mounting device 12, in other words the opposite side of the surface 22 of the support part 20.

In the preferred embodiment of the invention shown in FIGS. 1 and 2, the first arm 14 is materialized by two variable length arms 30 placed side by side approximately parallel to each other. A first end of a first arm 13 (located in the foreground in FIG. 2) is connected to a first anchor part 16 (at the left in FIG. 2). The second end of this first arm 30 (at the right in FIG. 2) is fixed to a connecting part 28 that itself is connected to the support parts 20 by one of the second sides 18. The other second side 18 connects the support part 20 to a second connecting part 28 (at the left in FIG. 2). This second connecting part 28 is itself fixed to a first end of the other first arm 30 (at the back in FIG. 2) adjacent to the end of the first arm 30 connected to the first anchor part 16. Finally, the second end of the other first arm 30 (at the right in FIG. 2) is connected to the second anchor part 16.

In the preferred embodiment of the invention illustrated in more detail in FIG. 2, one end of each of the second sides 18 is connected to the support part 20 by a friction free hinge with zero play 26. The second end of each of the second sides 18 is connected to the connecting part 28 fixed to the corresponding end of the first arm 14 by another friction free hinge with zero play 26. Optionally, another friction free hinge with zero play 26 is inserted between the first end of the first arm 30 (in the foreground in FIG. 2) and the first of the anchor parts 16 (at the left in FIG. 2), and between the second end of the other arm 30 (in the background in FIG. 2) and the second anchor part 16 (at the right in FIG. 2).

In the embodiment shown in FIGS. 1 and 2, each of the friction free hinges with zero play 26 comprises a pair of flexible strips 36. The flexible strips 36 of each hinge means 26 are placed end to end aligned with the end of the corresponding arm 14 or 18, along the longitudinal axis of this arm. Furthermore, the two flexible strips 36 of the same hinge 26 are plane when at rest and located in two planes orthogonal to each other and passing through the longitudinal axis of the corresponding arm. More precisely, one of the flexible strips 36 in each hinge 26 is located in the plane of the triangle formed by the mounting device 12, whereas the other flexible strip 36 of this same hinge 26 is located in a plane perpendicular to the plane of the triangle mentioned above.

Furthermore, guide means are provided between each of the anchor parts 16 and the end of the arm 30 that is not connected to this anchor part through a friction free hinge with zero play 26. These guide means are denoted in general as reference 32 in FIG. 2.

In the preferred embodiment of the invention illustrated in FIGS. 1 and 2, the guide means 32 are friction free translation guide means with zero play. They are inserted between anchor parts 16 and connecting parts 28 fixed at the corresponding ends of the arms 30.

In the embodiment of the invention illustrated in particular in FIG. 2, the translation guide means 32 comprise two flexible strips 34 approximately planar when the extension of the two arms 30 is approximately half way between the minimum and maximum, elongations. The two flexible strips 34 in each guide means 32 are parallel to each other and perpendicular to the longitudinal axis of the arm 30 that they guide. Furthermore, each of the two flexible strips 34 is fixed at different locations to the anchor part 16 and to the connecting part 28 between which these strips are inserted.

More precisely, in the embodiment shown in FIG. 2, the flexible strips 34 are approximately rectangular strips that are fixed to connecting parts 28 near their center and to anchor parts 16 at two opposite ends.

Since they are thin, the flexible strips 34 deform when the first arms 30 are extended or retracted. This deformation allows relative displacement of the connecting parts 28 in translation with respect to anchor parts 16 parallel to the longitudinal axes of the arms 30. All other relative movements are prevented.

In practice, the first variable length arms 30 are formed by linear actuators of any nature, the length of which may be modified by an electrical, mechanical or thermal remote control. Thus, the linear actuators forming the first arms 30 in the embodiment shown in FIGS. 1 and 2 may for example be piezoelectric elements, electrostritive or magnetostrictive motors, screw-nut type mechanisms, or elements that expand as a result of thermal expansion.

Furthermore, in the first embodiment shown in FIGS. 1 and 2, the other two sides 18 of the triangle formed by each mounting device 12 are materialized by rigid fixed length arms 38.

In the embodiment that has just been described with reference to FIGS. 1 and 2, when a variation in the length of each the first arms 30, such as an elongation, is controlled simultaneously, this length variation is made in the opposite direction on each arm, since they are assembled in opposite directions between anchor parts 16.

Consequently, an identical and simultaneous elongation of each of the arms 30 causes connecting parts 28 to move away from each other and consequently deformation of the triangle formed by each of the mounting devices 12, tending to bring the support part 20 of the two anchor parts 16 close together parallel to the axis of symmetry 10 of the assembly.

This deformation is possible due to the hinges 26 that are located along the same line as the rigid arms 38. The other hinges 26 in line with the first arms 30 reduce bending in the linear actuators of these arms, when necessary due to their mechanical strength. This is the case particularly when these actuators are piezoelectric elements.

Different deformations of the triangle may be obtained by controlling different length variations of the first arms 30. It is thus possible to move the support part 20 in the direction of the axis 10 and in a tangential direction about a circle centered on this axis, in a combined or separate manner depending on the required movement.

Note that the magnitude of the angle formed between the two sides 18 gives preference to displacements of the support part 20 along a direction parallel to the axis of symmetry 10, or along a tangential direction about a circle centered on this axis, depending on the case. Thus, displacements about axis 10 are given priority when this angle is open, while displacements along a tangential direction are given priority when the angle is closed.

The magnitude of the above mentioned angle also influences the forces that are applied to arms 38, and the actuators making up arms 30. The choice of this angle when the assembly is designed is therefore a compromise between the required displacement amplitudes and the allowable forces on the actuators.

The combination of the different displacements authorized by each of the mounting devices 12 can be used to obtain the six degrees of freedom required for the supported device on the mounting assembly.

Figure 3:
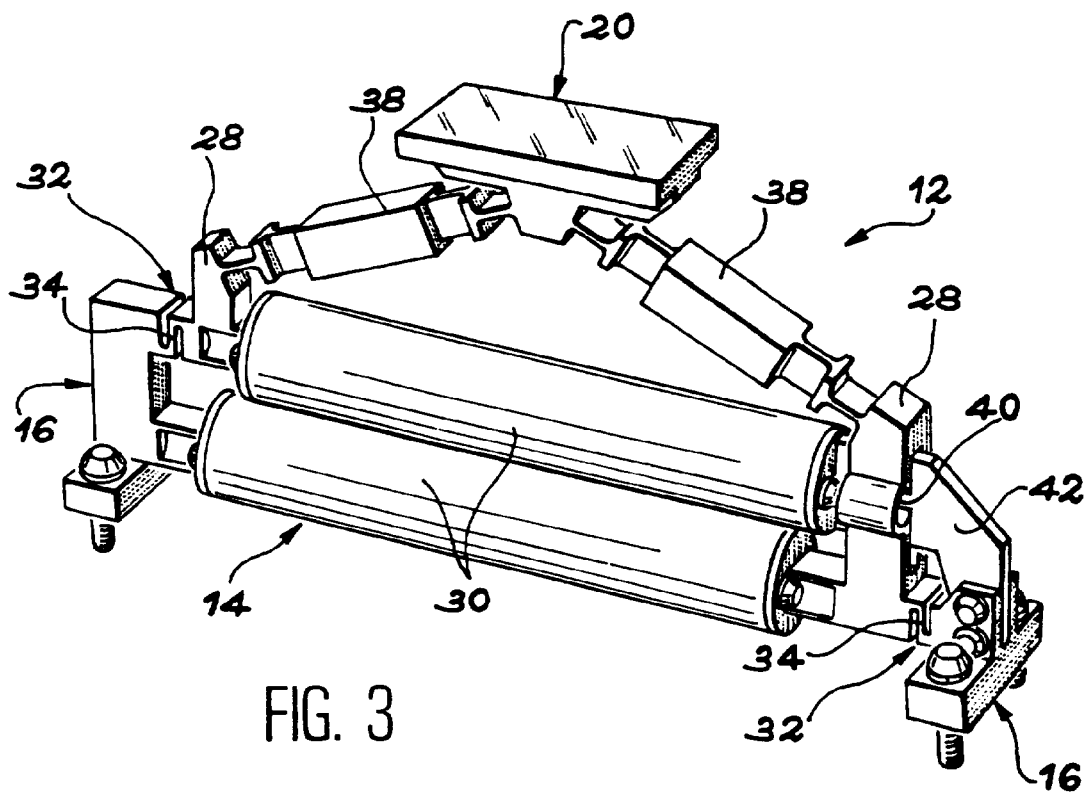
FIG. 3 is a perspective view comparable to FIG. 2 illustrating a variant of the preferred embodiment of the invention.

FIG. 3 shows a variant of the preferred embodiment of the invention. This variant is distinguished mainly by the relative layout of the first two arms 30, each of which is composed of a linear actuator as described above. Thus, instead of being laid out such that the plane formed by their parallel longitudinal axes is perpendicular to the plane of the triangle formed by each mounting device 12, the two arms 30 are mounted such that these two planes are coincident. In other words, the parallel longitudinal axes of the first two arms 30 are within the plane of the triangle.

This layout means that the two anchor parts 16 and the two connecting parts 28 have different shapes. It also means that the shape of the translation guide means 32 inserted between each of the connecting parts 28 and the adjacent anchor part 16, are modified.

In particular, the connecting part 28 located to the right of FIG. 3 that connects the mobile end of the first arm 30 furthest from the support part 20 to one of the second arms 38, is provided with a passage 40. A part 42 of the anchor part 16, to which the corresponding end of the first arm 30 closest to the support part 20, can pass through this passage 40 freely, preferably without any friction and without any play.

Furthermore, in this case the friction free translation guide means 32 with zero play consist of a single strip 34. This rectangular shaped strip 34 is fixed by its two opposite ends to one of the connecting parts 28 and to the adjacent anchor part 16, respectively.

Figure 4:
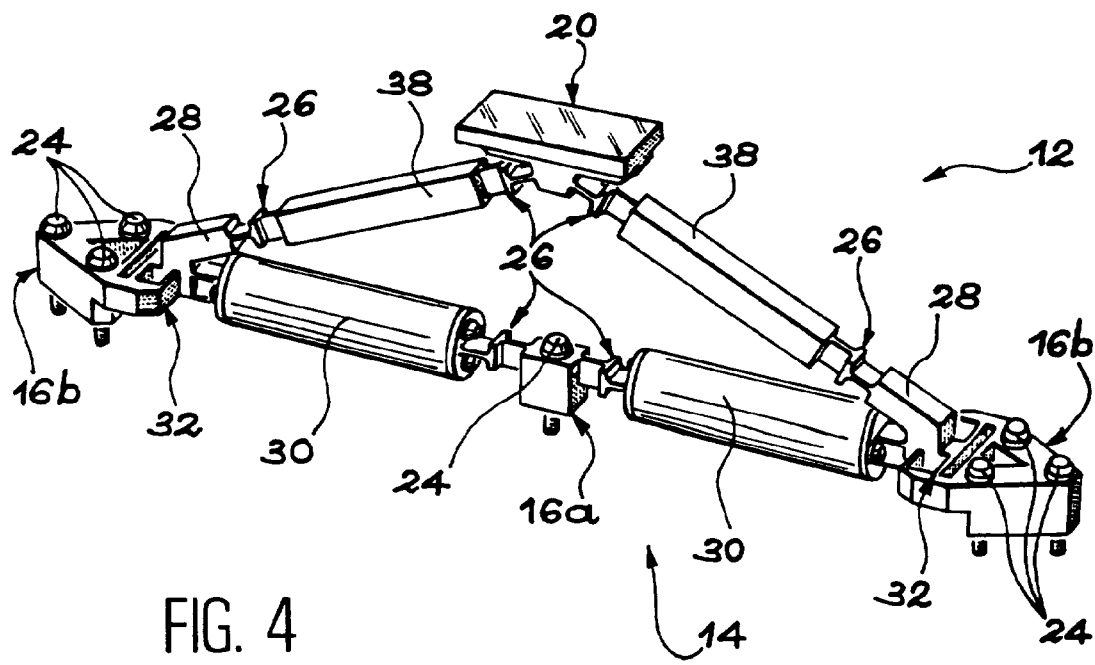
FIG. 4 is a perspective view comparable to FIGS. 2 and 3, illustrating a first variant embodiment of the invention.

FIG. 4 shows one of the three mounting devices 12 of a mounting assembly made according to a first variant embodiment of the invention.

In this first embodiment of the invention, the first arm 14 of the triangle formed by each mounting device 12 comprises two arms 30 placed end to end such that their longitudinal axes are coincident.

In this case, the adjacent ends of the two arms 30 are connected to a first anchor part 16a, optionally through two friction free hinges 26 with zero play.

The opposite ends of the first arms 30 are rigidly attached to two connecting parts 28 that are assembled in two second anchor parts 16b through translation guide means 32, along a longitudinal axis common to the first two arms 30.

The hinges 26, and the translation guide means 32, are made in the same way as in the preferred embodiment described previously with reference to FIGS. 1 and 2.

The anchor parts 16a and 16b are fixed to the support structure (not shown), for example using screw 24 as in the preferred embodiment of the invention.

Figure 5:
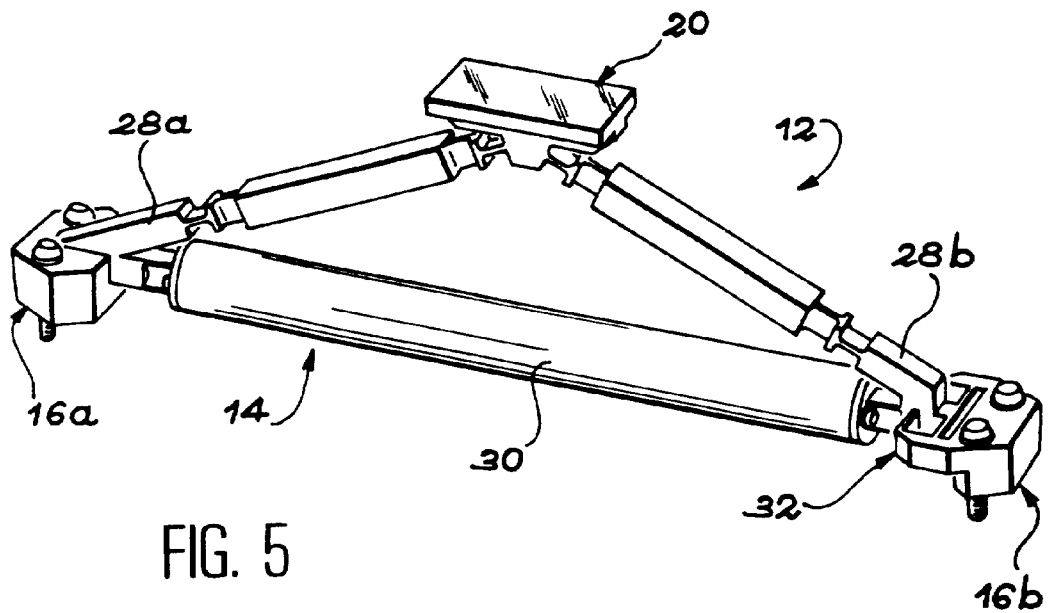
FIG. 5 is a perspective view comparable to FIGS. 2 to 4, illustrating a second variant embodiment of the invention.

FIG. 5 shows one of the three mounting devices 12 of a mounting assembly according to a second variant embodiment of the invention.

In this second variant embodiment of the invention, the first arm 14 of the triangle formed by each of the mounting devices 12 is materialized by a single arm 30, one first end of which is fixed to a first anchor part 16a fixed to a first connecting part 28a. The second end of arm 30 is fixed to a second connecting part 28b that works in cooperation with a second anchor part 16b through friction free translation guide means 32.

The friction free translation guide means 32 are preferably made as described above with reference to FIGS. 1 and 2 for the preferred embodiment.

In this second embodiment of the invention, since each of the mounting devices 12 comprises a single arm 30, in other words a single linear actuator, displacement of the support part 20 necessarily combines a displacement along a direction parallel to the axis of symmetry 10 of the assembly and a displacement along a tangential direction.

Figure 6:
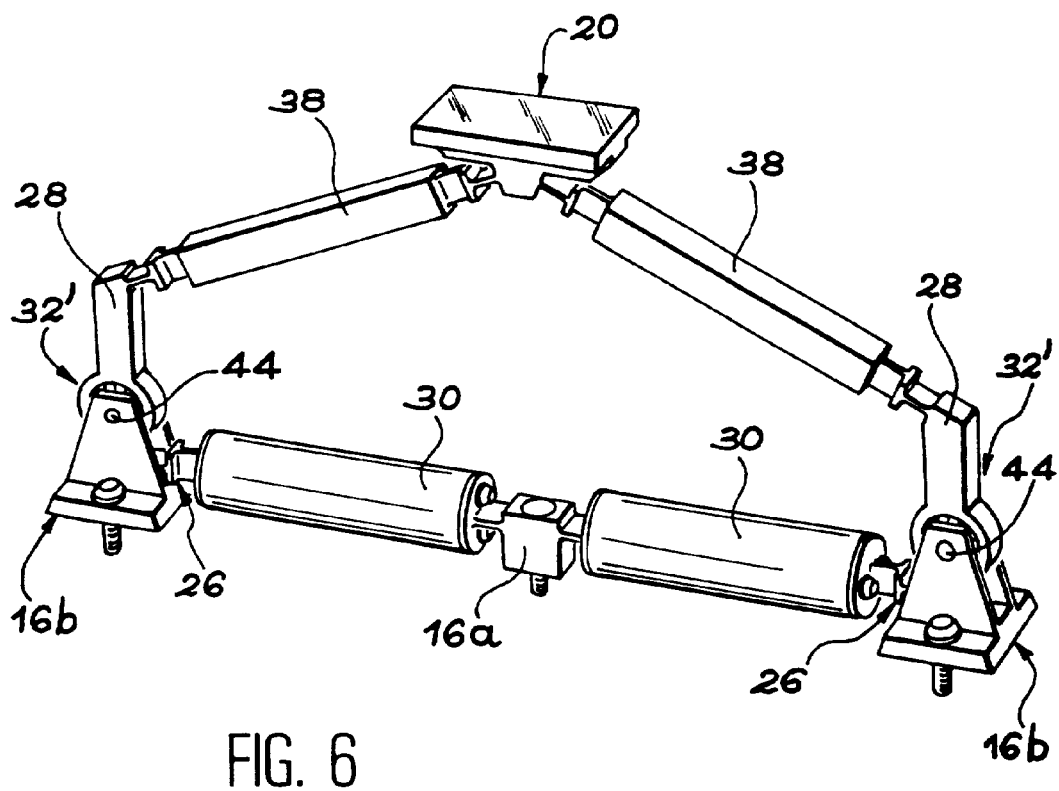
FIG. 6 is a perspective view comparable to FIGS. 2 to 5, illustrating another embodiment of guide means applied to the first variant embodiment of the invention.

FIG. 6 illustrates another embodiment of guide means 32 that are inserted between one of the ends of each of the first arms 30 and the corresponding anchor part. This other embodiment is represented within the framework of the variant described above with reference to FIG. 4. However, it may also be applied to the preferred embodiment and to the first described variant without going outside the framework of the invention.

In this case, instead of guidance in translation parallel to the longitudinal axis of the corresponding arm 30, the guide means 32 consist of rotation guide means around a pivoting axis 44 perpendicular to the plane of the triangle formed by the mounting device concerned.

More precisely, each of the connecting parts 28 is assembled to pivot on the anchor part 16b corresponding to it through one of the axes 44. The axes 44 are offset towards the support part 20 with respect to the longitudinal axis common to the two arms 30, such that the connecting parts 28 are then in the form of two pivoting levers.

A friction free hinge with zero play 26 connects the ends of each connecting part 26, to the corresponding adjacent ends of the first arm 30 and second arm 38, respectively.

In this case, the hinge means 26 are made in the same way as in the preferred embodiment described with reference to FIGS. 1 and 2.

Figure 7:
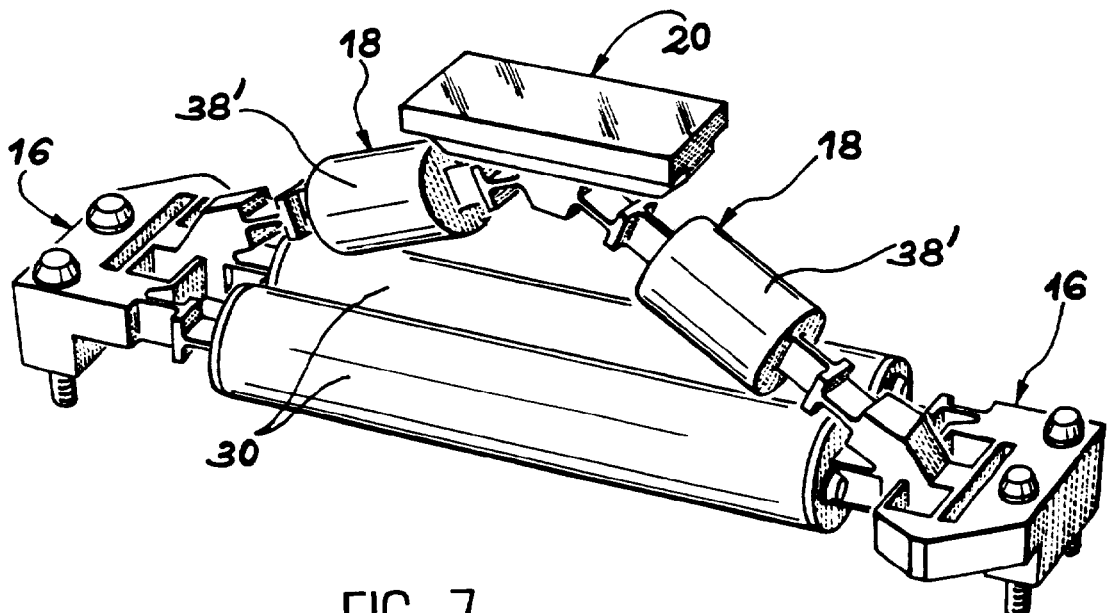
FIG. 7 is a perspective view comparable to FIGS. 2 to 6, illustrating another embodiment of the other arms, applied to the first preferred embodiment of the invention.

FIG. 7 shows an other embodiment of the second sides 18 of the triangle formed by each of the mounting devices 12 in the assembly. This embodiment is illustrated in the case of the preferred embodiment described above with reference to FIGS. 1 and 2. However, it may also be applied to the first and second variants described above, without going outside the framework of the invention.

In this other embodiment, instead of being materialized by rigid arms with fixed lengths, the second sides 18 of the triangle are materialized by variable length arms 38'. Like the arm(s) 30, these variable length arms 38' are composed of linear actuators that may be controlled by any appropriate means. This layout can amplify the movement capabilities of the support parts 20 mounted on the device to be supported (not shown).

Due to the manufacture of each of the mounting devices 12 in the form of a deformable triangle, there is an integrated and compact assembly capable of correcting the position of the supported device around six degrees of freedom, while providing filtering that prevents any deformation of this device. The resulting position correction is characterized by a movement distance of a few hundred micrometers in translation and a few hundred microradians in rotation, with a resolution of a few tenths of a micrometer.

What is claimed is:

1. A mounting assembly for a device positionable on a support structure, said assembly comprising:
    three mounting devices each in the form of a deformable triangle in which a first variable length arm is mounted at its opposite ends on a pair of anchor parts that are connected to the support structure, and a first vertex opposite the first arm comprising a support pair which are connected to the device to be mounted.

2. Assembly according to claim 1, in which the three mounting devices are of substantially identical structure.

3. Assembly according claim 1, in which the three mounting devices are uniformly distributed around an axis at least substantially coincident with an axis of symmetry of the three mounting devices.

4. Assembly according to claim 4, in which planes containing triangles formed by the mounting devices are approximately tangent to a circle centered on said axis of symmetry.

5. Assembly according to claim 1, in which the additional arms of the triangle formed by each mounting device comprise variable length arms.

6. Assembly according to claim 1, in which additional arms of the triangle formed by each mounting device comprise substantially rigid arms, wherein the triangle comprises three arms connected to each other by friction free hinges with zero play.

7. Assembly according to claim 6, wherein the friction free hinges with zero play comprise pairs of flexible strips supported at least beyond each end of the additional arms of the triangle formed by each mounting device and aligned with said additional arms, each of said pairs of flexible strips comprising two flexible strips fixed end to end along a longitudinal axis of the arm from which they extend, and located in two planes orthogonal to each other and passing through the longitudinal axis of the arm.

8. Assembly according to claim 6, which comprises a support part wherein remaining sides of the triangle formed by each mounting device are connected to the support part by friction free hinges with zero play.

9. Assembly according to claim 6, wherein vertices of the triangle formed by each mounting device comprise two connecting parts, and two remaining arms of said triangle are connected to each connecting part by means of one of the friction free hinges with zero play.

10. Assembly according to claim 9, in which the first arm of the triangle formed by each mounting device comprises guide means and two variable length arms located side by side approximately parallel to each other, the two first opposite ends of each of these two arms being connected to two anchor parts wherein two opposite ends of the first opposite ends of the two arms cooperating with the two anchor parts through said guide means.

11. Assembly according to claim 10, in which each connecting part is fixed to one of said other opposite ends of the arms, and said guide means are inserted between the connecting parts and the anchor parts.

12. Assembly according to claim 11, wherein one of the friction free hinges with zero play is positioned between the first end of each of the arms and the anchor part to which this first end is connected.

13. Assembly according to claim 10, in which longitudinal axes of the two variable length arms are located in a plane which is approximately perpendicular to a plane containing the triangle formed by the mounting device containing said two variable length arms.

14. Assembly according to claim 10, in which the two arms comprise longitudinal axes located in a plane containing the triangle formed by the mounting device containing said two arms.

15. Assembly according to claim 10, wherein the guide means comprise friction free translation guide means with zero play.

16. Assembly according to claim 15, in which the guide means comprise at least one flexible strip perpendicular to such common longitudinal axis of an arm with which the guide means cooperate, the said flexible strip connecting said arm with which the guide means cooperate to an adjacent anchor part.

17. Assembly according to claim 10, in which the guide means comprise guide means rotatable about an axis perpendicular to a plane containing the triangle formed by each mounting device.

18. Assembly according to claim 9, in which the first arm of the triangle formed by each mounting device comprises two variable length arms located end to end along a common longitudinal axis, two first opposite ends of each of these two arms cooperating with the said pair of anchor parts through guide means, and two second adjacent ends of each of the two arms being connected to a third anchor part which is securable to the support structure.

19. Assembly according to claim 18, in which each connecting part is connected to one of the second ends of the arms and guide means are positioned between the connecting parts and a second pair of anchor parts.

20. Assembly according to claim 19, in which one of the said friction free hinges with zero play is positioned between the first end of each of the two arms and the connecting part to which each of the two arms is connected.

21. Assembly according to claim 20, which comprises a first connecting part fixed to a first anchor part, a second connecting part being fixed to a second end of the single arm, and guide means positioned between the second connecting part and a second anchor part.

22. Assembly according to claim 18, in which one of the said friction free hinges with zero play is positioned between the third anchor part and the second end of each of the two arms.

23. Assembly according to claim 18, in which the device to be supported comprises a space telescope mirror.

24. Assembly according to claim 9, comprising guide means wherein the first arm of the triangle formed by each mounting device comprises a single variable length arm, a first end of which is fixed on a first anchor part in the said pair of anchor parts, and a second end of which cooperates with a second anchor part of the said pair of anchor parts, through said guide means.

* * * * *